United States Patent
Ancimer et al.

(10) Patent No.: US 6,912,992 B2
(45) Date of Patent: *Jul. 5, 2005

(54) METHOD AND APPARATUS FOR PILOT FUEL INTRODUCTION AND CONTROLLING COMBUSTION IN GASEOUS-FUELLED INTERNAL COMBUSTION ENGINE

(75) Inventors: Richard Ancimer, Vancouver (CA); Konstantin V. Tanin, Vancouver (CA)

(73) Assignee: Cummins Westport Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/679,766

(22) Filed: Oct. 6, 2003

(65) Prior Publication Data

US 2004/0118557 A1 Jun. 24, 2004

Related U.S. Application Data

(63) Continuation-in-part of application No. 09/748,547, filed on Dec. 26, 2000, now Pat. No. 6,640,773.

(51) Int. Cl.[7] .................................................. F02B 3/00
(52) U.S. Cl. ....................................... 123/299; 123/300
(58) Field of Search ................................. 123/299, 300, 123/429, 430, 431, 434, 436, 676, 681, 687

(56) References Cited

U.S. PATENT DOCUMENTS

| | | | |
|---|---|---|---|
| 4,694,802 A | 9/1987 | Lowi, Jr. | 123/431 |
| 4,768,481 A | 9/1988 | Wood | 123/254 |
| 5,060,610 A | 10/1991 | Paro | 123/300 |
| 5,205,254 A | 4/1993 | Ito et al. | 123/305 |
| 5,482,016 A | 1/1996 | Ohishi et al. | 123/299 |
| 5,832,880 A | 11/1998 | Dickey | 123/25 |
| 5,875,743 A | 3/1999 | Dickey | 123/25 |
| 5,996,558 A | 12/1999 | Ouellette et al. | 123/506 |
| 6,032,617 A | 3/2000 | Willi et al. | 123/27 |
| 6,095,102 A | 8/2000 | Willi et al. | 123/27 |
| 6,202,601 B1 | 3/2001 | Ouellette et al. | 123/27 GE |
| 6,386,177 B2 | 5/2002 | Urushihara et al. | 123/299 |
| 6,412,469 B1 | 7/2002 | Itoyama et al. | 123/299 |
| 6,484,689 B1 | 11/2002 | Hasegawa | 123/299 |
| 6,491,016 B1 | 12/2002 | Buratti | 123/299 |

FOREIGN PATENT DOCUMENTS

| | | |
|---|---|---|
| WO | WO 98/10179 | 3/1998 |
| WO | WO 00/28197 | 5/2000 |
| WO | WO 00/28198 | 5/2000 |

OTHER PUBLICATIONS

Thring et al., "The Stratified Charge Glowplug Ignition (SCGI) Engine with Natural Gas Fuel," *SAE Technical Paper Series 911767*, 1991.

(Continued)

Primary Examiner—John T. Kwon
(74) Attorney, Agent, or Firm—McAndrews, Held & Malloy, Ltd.

(57) ABSTRACT

A method and apparatus for introducing pilot fuel into a piston cylinder of an operating gaseous fuelled internal combustion engine monitoring a set of engine parameters, determining engine load and engine speed from the set of engine parameters, introducing a first portion of the gaseous fuel into the cylinder where the first portion of gaseous fuel forms a substantially homogeneous mixture comprising gaseous fuel and air prior to combustion, and introducing a pilot fuel to avoid a excessive knocking range for the engine. A second quantity of gaseous fuel can also be added to burn in a substantially diffusion combustion mode.

24 Claims, 3 Drawing Sheets

OTHER PUBLICATIONS

Yonetani et al., "Hybrid Combustion Engine With Premixed Gasoline Homogeneous Charge and Ignition By Injected Diesel Fuel—Exhaust Emission Characteristics," *SAE Technical Paper Series 940268*, pp. 1451–1461, Feb., 1994.

Suzuki et al., "Exhaust Purification of Diesel Engines by Homogeneous Charge with Compression Ignition Part 1: Experimental Investigation of Combustion and Exhaust Emission Behavior Under Pre–Mixed Homogenous Charge Compression Ignition Method," *SAE Technical Paper Series 970313*, Feb., 1997.

Ishii et al., "Exhaust Purification of Diesel Engines by Homogenous Charge with Compression Ignition Part 2: Analysis of Combustion Phenomena and NOx Formation by Numerical Simulation with Experiment," *SAE Technical Paper Series 970315*, Feb., 1997.

Smith et al., "Modeling of Homogenous Charge Compression Ignition (HCCI) of Methane," *Lawrence Livermore National Laboratory UCRL–JC–127387*, May, 1997.

Christensen et al., "Homogenous Charge Compression Ignition (HCCI) Using Isooctane, Ethanol and Natural Gas– A Comparison with Spark Ignition Operation," *SAE Technical Paper Series 972874*, Oct., 1997.

Suzuki et al., "Combustion Control Method of Homogenous Charge Diesel Engines," *SAE Technical Paper Series 980509*, Feb., 1998.

Christensen et al., "Supercharged Homogenous Charge Compression Ignition," *SAE Technical Paper Series 98087*, Feb., 1998.

Christensen et al., "Influence of Mixture Quality on Homogenous Charge Compression Ignition," *SAE Technical Paper Series 982454*, Oct., 1998.

Christensen et al., "Homogenous Charge Compression Ignition with Water Injection," *SAE Technical Paper Series 1999–01–0182*, Mar., 1999.

Flowers et al., "HCCI in a CFR Engine: Experiments and Detailed Kinetic Modeling," *SAE Technical Paper Series 2000–01–0328*, Mar., 2000.

Chen et al., "Experimental Study of C1 Natural–Gas/DME Homogenous Charge Engine," *SAE Technical Paper Series 2000–01–0329*, Mar., 2000.

Olsson et al., "Experiments and Simulation of a Six–Cylinder Homogenouos Charge Compression Ignition (HCCI) Engine," *SAE Technical Paper Series 2000–01–2867*, Oct., 2000.

Martinez–Frias et al., "HCCI Engine Control by Thermal Management," *SAE Technical Paper Series 2000–01–2869*, Oct., 2000.

Kontarakis et al., "Demonstration of HCCI Using a Single Cylinder Four–Stroke SI Engine with Modified Valve Timing," *SAE Technical Paper Series 2000–01–2870*, Oct., 2000.

METHOD AND APPARATUS FOR PILOT FUEL INTRODUCTION AND CONTROLLING COMBUSTION IN GASEOUS-FUELLED INTERNAL COMBUSTION ENGINE

CROSS-REFERENCE TO RELATED APPLICATION(S)

This application is a continuation-in-part of U.S. patent application Ser. No. 09/748,547 filed Dec. 26, 2000, now U.S. Pat. No. 6,640,773, issued Nov. 4, 2003, entitled "Method and Apparatus for Gaseous Fuel Introduction and Controlling Combustion in an Internal Combustion Engine". The '547 application is hereby incorporated by reference herein in its entirety.

FIELD OF THE INVENTION

The present invention relates to a method and apparatus for introducing pilot fuel into the cylinder of a gaseous-fuelled internal combustion engine. More specifically, the present invention relates to a method of, and apparatus for, the introduction of gaseous fuel into the engine's cylinder and the timing of pilot fuel introduction for igniting the gaseous fuel and controlling the combustion mode of the gaseous fuel introduced.

BACKGROUND OF THE INVENTION

The internal combustion engine industry is under ever increasing pressure to reduce pollution to the environment by lowering harmful engine emissions. One response to this pressure has resulted in research into adapting compression ignition (CI) engines (also known as "diesel" engines) to burn natural gas instead of diesel fuel. Compared to diesel fuel, natural gas is a relatively clean burning fuel and the substitution of natural gas for diesel fuel can reduce emission levels of both nitrogen oxides (NOx) and particulate matter (PM).

A known technique for substituting natural gas for diesel fuel is called dual fuel operation. In this method, natural gas is mixed with intake air prior to introducing the air/natural gas mixture into the engine cylinder (a process known in the art as fumigation). The mixture is then introduced into the piston cylinder during the intake stroke. During the compression stroke, the pressure and temperature of the mixture are increased. Near the end of the compression stroke, dual fuel engines inject a small quantity of pilot diesel fuel to ignite the mixture of air and natural gas. Combustion is triggered by the auto-ignition of the diesel fuel and it is believed that a propagation combustion mode occurs under these conditions. One advantage of employing a pre-mixed charge of air and natural gas is that the fuel to air ratio can be lean. With fumigation it is possible to realize the advantages of "lean burn" operation, which include lower NOx emissions, lower PM and a potentially higher cycle efficiency.

Known dual fuel methods, however, have at least two disadvantages. One disadvantage is encountered at high load engine operating conditions, when the elevated temperature and pressure in the piston cylinder during the compression stroke makes the air/natural gas mixture susceptible to "knocking". Knocking is the uncontrolled auto-ignition of a premixed fuel/air charge. Knocking leads to a rapid rate of fuel energy release that can damage engines. Measures to reduce the risk of knocking include lowering the compression ratio of the piston stroke or limiting the power and torque output. These measures, however, cause a corresponding reduction in the engine's cycle efficiency (that is, not as much power is available from each piston stroke).

A second disadvantage of known dual fuel methods is that under low load engine operating conditions, the mixture of fuel and air becomes too lean to support stable premixed combustion and results in incomplete combustion or misfiring. The intake air flow can be throttled to maintain a mixture that can sustain premixed combustion, but throttling adversely affects engine efficiency.

A second type of engine substitutes gaseous fuel for diesel fuel in an internal combustion engine is sometimes referred to as a "high pressure direct injection" engine. Similar to conventional dual fuel engines, which employ the above-described method, a large fraction of the fuel burned in high pressure direct injection engines is gaseous, yielding an improvement (over engines burning only diesel fuel) with respect to the emission levels of NOx and PM. In addition, high pressure direct injection engines have the potential to achieve the same cycle efficiency, power and torque output as counterpart conventional diesel-fuelled engines. The operational principle underlying high pressure direct injection engines is that two fuels are injected under pressure into the engine cylinder near the end of the compression stroke. According to one method, a small quantity of "pilot fuel" (typically diesel) is injected into the cylinder immediately followed by a more substantial quantity of gaseous fuel. The pilot fuel readily ignites at the pressure and temperature within the cylinder at the end of the compression stroke, and the combustion of the pilot fuel initiates the combustion of the gaseous fuel. Accordingly, high pressure direct injection engines generally have little or no pre-mixture of gaseous fuel and air, and thus the gaseous fuel burns in a "diffusion" combustion mode, rather than a premixed combustion mode.

A two-fuel injector is used to provide a means to practise high pressure direct injection combustion. The two-fuel injector can independently inject a pilot and a gaseous fuel.

An advantage of high pressure direct injection engines over conventional dual fuel mode operation is that they are not susceptible to knocking under high load conditions because the air and gaseous fuel are not pre-mixed and the gaseous fuel is not introduced into the cylinder until after the pilot fuel. Another advantage of high pressure direct injection engines is the ability to operate under low load conditions without the need to throttle the engine.

In addition to the dual fuel and high pressure direct injection combustion modes, the HCCI combustion mode is available for gaseous fuels in internal combustion engines. Homogeneous charge compression ignition (HCCI) is an alternative to the propagation mode of combustion for providing a mode of lean burn pre-mixed combustion. Experimental HCCI engines generally introduce a homogeneous mixture of fuel and air into the engine cylinder(s). Under certain conditions, compression heating of the charge leads to ignition throughout the bulk of the pre-mixed charge without flame propagation, and this combustion mode is defined herein as HCCI. HCCI is essentially a "controlled knock" condition where the combustion rate is mainly controlled by the chemical reaction kinetics. HCCI is thus distinct from a combustion mode controlled by flame propagation. In a flame propagation combustion mode, when a homogeneous mixture of fuel and air is sufficiently rich to sustain a flame and is ignited at a point, a flame front forms and advances from the ignition point. In a flame propagation combustion mode, the rate of combustion is limited by the transfer of the unburned mixture of fuel and air into the flame reaction zone.

An advantage of a HCCI combustion mode is that very lean mixtures of fuel and air mixtures can be burned. For example, a fuel/air equivalence ratio of between 0.1 to 0.5 can burn in a HCCI combustion mode, whereas under the same conditions, in a propagation combustion mode combustion would be unstable, leading to misfire or partial burn. With a HCCI combustion mode, under very lean conditions, NOx formation rates can be substantially reduced relative to more typical lean burn flame propagation combustion modes.

With a HCCI engine the rate of combustion is potentially very rapid, resulting in high engine cycle efficiencies (relative to a conventional diesel-fuelled engine). However, a disadvantage of HCCI combustion is the lack of direct control over the start and rate of combustion because only indirect control methods are available. Recent studies of HCCI combustion show that the main control strategies over HCCI mode combustion include:

(a) using variable intake manifold temperatures (cooled exhaust gas recirculation (EGR) and intake air heating);
(b) using residual gas trapping;
(c) controlling intake manifold pressure;
(d) controlling premixed charge fuel/air equivalence ratio;
(e) controlling fuel type and blend;
(f) using a variable compression ratio;
(g) using EGR rates to control rate of combustion;
(h) addition of water in the intake charge to control the rate of combustion.

Another disadvantage of HCCI combustion is that at high load conditions, the higher fuel/air ratios result in HCCI combustion rates which can cause engine damage by combusting too rapidly, or by the rate of combustion causing very high in-cylinder pressures. Extending the operable range for HCCI combustion has been achieved through supercharging; use of EGR to reduce rate of heat release; late injection of diesel fuel; varying the compression ratio; and injection of gaseous fuel near top dead centre of the compression stroke. The result is two separate combustion modes in the same engine cycle. The two combustion mode approach, referred to here as HCCI-DI combustion, allows the operable power range of the engine to be extended while still benefitting from the low NOx and high efficiency of the HCCI event.

As discussed above, HCCI events on their own or in combination with a diffusion combustion mode, require a means to control the start of combustion. With the advent of the two fuel injector used for fuelling high pressure direct injection engines, one means available to control the start of the HCCI event is through the use of a pilot fuel. Here, consideration is given to a means of using a pilot fuel to control the HCCI event in the HCCI or HCCI-DI engine.

SUMMARY OF THE INVENTION

A method is provided for controlling pilot fuel injection in a cylinder of an operating internal combustion engine.

A method is provided for introducing a pilot fuel into a cylinder of an operating internal combustion engine, which has a piston disposed within the cylinder. The method comprises:
(a) monitoring a set of engine parameters;
(b) determining engine load and engine speed from the set of engine parameters;
(c) introducing a first quantity of a first gaseous fuel and an intake charge into the cylinder;
(d) introducing a pilot fuel quantity of the pilot fuel at the pilot fuel timing into the cylinder so that it ignites when the piston is at or near top dead centre of the compression stroke, the pilot timing avoiding a excessive knocking range during a compression stroke of the engine;
wherein the first quantity, the pilot fuel quantity and the pilot fuel timing are controllable in response to engine load or engine speed, the first quantity forming a premixed charge of fuel and air prior to ignition of the pilot fuel.

In a preferred method, within the same engine cycle, the excessive knocking range is between 50 and 30 crank angle degrees before top dead center during the compression stroke.

The method further comprises directly injecting a second quantity of a second gaseous fuel into the combustion chamber when the piston is at or near top dead center wherein within the same engine cycle, the first gaseous fuel combusts according to a pre-mixed combustion mode and the second gaseous fuel combusts substantially according to a diffusion combustion mode.

For improved efficiency and reduced emissions, the mixed combustion mode is preferably a homogeneous charge compression ignition mode.

The engine can be a two-stroke engine but is preferably a four-stroke engine.

The first gaseous fuel is pre-mixed with the intake charge prior to being introduced into the cylinder.

In a further preferred embodiment, the set of engine parameters preferably comprises at least one of engine speed, engine throttle position, intake manifold temperature, intake manifold pressure, exhaust gas recirculation flow rate and temperature, air flow into the cylinder, compression ratio, intake and exhaust valve timing, the presence or absence of knocking within the cylinder, and one of the start of combustion, heat release rate and pressure trace determined from a previous cycle of the engine.

In a further embodiment of the present method the pilot fuel timing is after the piston passes 120 crank angle degrees before top dead center of the compression stroke.

The amount of the pilot fuel is dependent on a signal capable of being used to estimate start of combustion of the gaseous fuel during a previous cycle of the engine.

The method further comprises identifying an low load operating mode and a high load operating mode for the engine, wherein the pilot fuel timing is a late timing in the low load operating mode and the pilot fuel timing is an early timing in the high load operating mode.

The early timing is prior to the excessive knocking range and the late timing is after the excessive knocking range. The method further comprises identifying a transition operating mode for the engine wherein the engine transitions between the low load operating mode and the high load operating mode. The transition operating mode transitions the pilot timing between the late timing and the early timing by jumping the excessive knocking range between successive cycles of the engine.

The transition operating mode also can comprise, within a cycle of the engine, at least two pilot fuel injections, a first pilot fuel injection prior to the excessive knocking range and a second pilot fuel injection after the excessive knocking range. When knocking is detected, pilot fuel quantity and pilot fuel timing can also be varied.

The pilot fuel can be mixed with the first gaseous fuels and introduced into the cylinder together with the first gaseous fuel. Preferably, the first and second gaseous fuels are the same gaseous fuel. Preferred pilot fuels include diesel fuel and dimethylether.

The first gaseous fuel is preferably at least one of natural gas, liquefied petroleum gas, bio-gas, landfill gas, and hydrogen gas.

An apparatus is provided for introducing fuel into the cylinder of an operating internal combustion engine having at least one cylinder with a piston disposed therein. The fuel comprises a main fuel and a pilot fuel that is auto-ignitable to a degree greater than the main fuel. The apparatus also comprises:

(a) measuring devices for collecting operational data from the engine, the measuring devices comprising a tachometer for measuring engine speed and a sensor for determining throttle position;

(b) an electronic control unit that receives the operational data and processes the data to compute a set of load conditions, the electronic control unit comprising memory for storing control sets of load conditions and predetermined operating modes for the control sets of load conditions, the electronic control unit matching the computed set of load conditions with the control sets of load conditions to select one of a plurality of predetermined operating modes;

(c) a main fuel introduction system controlled by the electronic control unit to introduce the main fuel into the cylinder at times and in quantities determined by the electronic control unit in accordance with the predetermined operating modes and the set of load conditions; and (d) a pilot fuel injection valve controlled by the electronic control unit to introduce the pilot fuel into the cylinder at times and in quantities determined by the electronic control unit with the predetermined operating modes and the set of load conditions;

The predetermined operating mode comprises a two stage introduction of fuel into the cylinder. A first portion of the main fuel is introduced in a first stage to provide for a premixed fuel/air charge prior to combustion of the pilot fuel and the pilot fuel is introduced in a second stage, the controller and the pilot fuel injection valve capable of detecting and avoid an excessive knocking range for introduction of the pilot fuel.

The main fuel introduction system comprises a main fuel injection valve and a pilot fuel injection valve which are preferably integrated into a dual fuel injection valve that is operable to inject each one of the main fuel and the pilot fuel independently from the other.

The apparatus can further comprise an auxiliary injection valve associated with an air induction system for introducing the main fuel into an air induction passage so that the main fuel is capable of mixing with intake air prior to being introduced to the cylinder. In a preferred embodiment, the air induction passage is an air induction manifold.

Further advantages for the present dual fuel injection technique will become apparent when considering the drawings in conjunction with the detailed description.

BRIEF DESCRIPTION OF THE DRAWINGS

FIG. 1, which comprises FIG. 1a depicts a portion of the main fuel being injected into the cylinder during the intake stroke, FIG. 1b depicts the injection of a pilot fuel during the compression stroke and FIG. 1c depicts the remainder of the main fuel being injected near top dead centre of the compression stroke.

DETAILED DESCRIPTION OF PREFERRED EMBODIMENT(S)

In a preferred method, fuel is injected into the cylinder of a four-stroke internal combustion engine having at least one reciprocating piston and a crankshaft associated with the piston. In this disclosure, the position of the piston within the cylinder is described with reference to crank angle degrees before or after top dead center (TDC). The piston is at TDC is when the piston has reached the end of an upward stroke and is about to begin a downward stroke (that is, the point when the piston is closest to the cylinder head).

The method involves a main fuel, which is preferably a gaseous fuel such as, for example, natural gas, propane, bio-gas, landfill gas or hydrogen gas. The method can further comprise the use of an ignition source to control the combustion timing of the main fuel. The ignition source can be, for example, a pilot fuel that auto-ignites more readily than the main fuel, a hot surface ignition source, such as a glow plug, a spark plug, or other known ignition device. When a pilot fuel is employed, preferred fuels are conventional diesel or dimethylether.

FIG. 1 illustrates a preferred method of introducing a main fuel into cylinder 210 in two separate stages, which further comprises the introduction of a pilot fuel to initiate combustion of the main fuel. In the embodiment shown, the main fuel introduced during a first stage mixes with the intake air and burns substantially in a homogeneous lean burn combustion mode, and a main fuel introduced during the second stage burns substantially in a diffusion combustion mode.

Figure 1A:
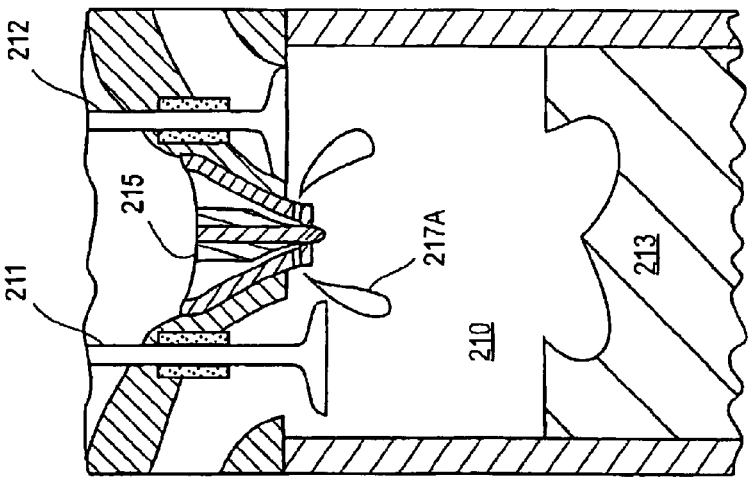
FIGS. 1a, 1b and 1c, depicts partial cross section views of an engine cylinder, showing the sequential injection of fuel into the cylinder with pilot fuel.

FIG. 1a shows the introduction of first stage main fuel 217a into cylinder 210 through injection valve 215 during the intake stroke when intake valve 211 is open and exhaust valve 212 is closed. In FIG. 1a piston 213 is at bottom dead center or moving away from injection valve 215. Main fuel 217a is introduced into cylinder 210 where it mixes with the intake air. In alternative embodiments (not shown), first stage main fuel introduction can be timed to occur when piston 213 is at bottom dead centre or during the compression stroke, when piston 213 is moving towards injection valve 215 and intake valve 211 is closed. However, delaying first stage main fuel introduction reduces the opportunity for main fuel 217a to mix with the intake air. Accordingly, if the first stage is timed to occur during the compression stroke, it is preferable for it to occur during the early part of the compression stroke, when piston 213 is near bottom dead centre.

The quantity of main fuel introduced during the first stage is limited to reduce the likelihood of knocking. Because the quantity of main fuel introduced during the first stage is limited to very lean conditions (that is, equivalence ratios between 0.10 and 0.50), combustion is expected to occur rapidly via a HCCI combustion mode. Ignition of the pre-mixed charge near top dead centre of the compression stroke results in high thermal efficiencies. Control over the start and rate of pre-mixed combustion is achieved by controlling at least one of intake manifold temperature, intake manifold pressure, EGR rate, EGR temperature, residual gas trapping fraction and compression ratio. In a preferred method, most or all of these parameters are controlled to control the timing of the auto-ignition of the pre-mixed charge via a HCCI combustion mode. Since the pre-mixed fuel and air burns under lean conditions, the NOx formation rate is relatively small.

Since the quantity of main fuel introduced in the first stage is limited to prevent knocking, an additional quantity of main fuel is introduced during the second stage to satisfy the engine load requirements. Preferably, the second stage injection of main fuel occurs near top dead centre, as shown in FIG. 2c. In FIG. 2c, piston 213 is moving away from injection valve 215, propelled by the combustion of fuel within cylinder 210. Intake valve 211 and exhaust valve 212 are both closed during the sequential compression and power strokes. Preferably, the second stage occurs late in the compression stroke or during the early part of the power stroke, since introduction of additional fuel late in the power stroke contributes less to engine power output than if it is added earlier. The second stage main fuel introduction is preferably completed before the crankshaft connected to piston 213 has rotated more than 50 degrees beyond the point when piston 213 was at TDC at the beginning of the power stroke.

Because second stage main fuel 217b is introduced near the end of the compression stroke or during the early part of the power stroke, it does not have an opportunity to thoroughly mix with the air in cylinder 210 prior to ignition. Consequently, second stage main fuel 217b burns substantially in a diffusion combustion mode. Since the quantity of first stage main fuel 217a is limited by the engine's knock limit, engine power output is controlled under high load conditions by adjusting the quantity of main fuel 217b introduced during the second stage.

Figure 1B:
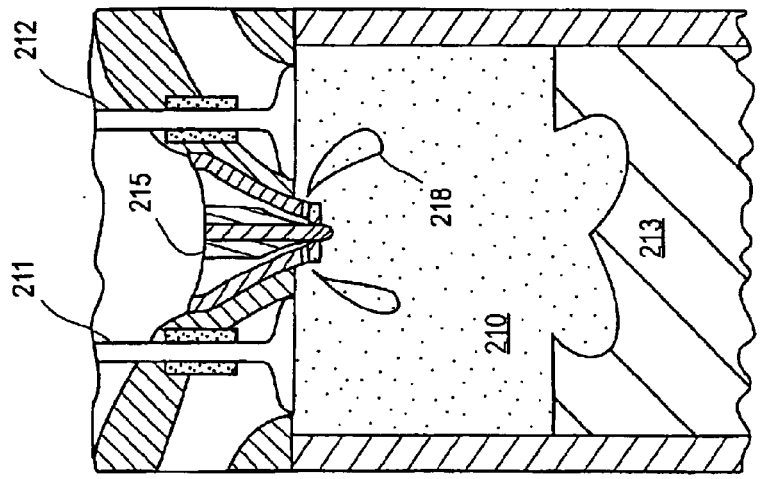

FIG. 1b depicts the introduction of pilot fuel 218 when piston 213 is moving towards injection valve 215 during the compression stroke. Intake valve 211 and exhaust valve 212 are both closed. The pilot fuel timing can be set during the intake stroke or early in the compression stroke such that the quantity of pilot fuel injected forms a substantially homogeneous charge within the cylinder. Under this premixed case, the pilot fuel acts to modify the auto-ignition properties of the fumigated charge. If the pilot fuel quantity is increased, there is a larger impact on the auto-ignition properties. The result is that the start of combustion is dependent on the quantity of pilot fuel injected. That is, increasing the pilot fuel quantity advances the start of combustion. However, under these pilot pre-mixed conditions, the cycle-to-cycle variations in the start of combustion can be large. Also, the quantity of pilot fuel required to modify the properties of a large portion of the intake charge is relatively large (this may be undesirable as the pilot fuel tends to cost more than the gaseous fuel).

In another embodiment, the pilot fuel can be injected into cylinder 210 when piston 213 is near TDC. Here, the temperature and pressure within the combustion chamber are such that the pilot fuel auto-ignites shortly after injection into the combustion chamber. As the pilot timing is advanced, the start of combustion advances in near proportion. For example, if the pilot timing is advanced by 5 degrees from y to y-5 degrees before top dead centre, then the start of combustion advances from x to approximately x-5 degrees before TDC. Note, however, that it is, in general, preferable to maintain start of combustion after 25 degrees before TDC. Otherwise, excessive knock within the cylinder can result. Thus, the late pilot timing should not be advanced beyond the point which results in a start of combustion before 25 degrees before TDC. To quantify this range, the late pilot timing range should occur after 35 degrees before TDC. Note, however, that the late pilot timing range limitation depends for the most part on injector design, the amount of pilot fuel injected, and the amount of premixed gaseous fuel. In this late pilot fuel injection embodiment, the pilot fuel burns substantially in a diffusion combustion mode, which results in higher NOx (and, potentially particulate) formation rates relative to the homogeneous pilot fuel case.

An alternate approach is to inject the pilot fuel at intermediate times such that a pre-mixed stratified charge of pilot fuel, main fuel, and air is formed within cylinder 210. In a preferred method, the stratified charge is overall lean with respect to the amount of pilot and main fuel within the pilot plume. When the pilot fuel plume ignites, pilot fuel 218 and main fuel trapped within the pilot plume both combust. The remainder of the fumigated charge outside the pilot plume ignites either through compressive and convective heating (preferred) or allowing a flame to propagate (unlikely where the charge is lean as tends to be the case practising this method). In either case, control over the on-set of the pre-mixed charge combustion can be controlled by burning a stratified pilot fuel plume. Since the pilot plume is overall lean, the benefits of lean burn combustion on NOx formation rates are realised in the pilot plume.

Because the pilot plume does not encompass the entire intake charge, an additional benefit of the pre-mixed stratified pilot combustion ignition mode is that the quantity of pilot fuel required is reduced relative to the early pilot fuel injection (this is an advantage because the pilot fuel is in general more expensive than the gaseous fuel). Preferably, the quantity of pilot fuel generally represents on average less than about 10% of the total quantity of fuel on an energy basis, with main fuel 217a and 217b providing the balance. At specific operating conditions the quantity of pilot fuel 218 can be higher or lower than 10% of the total fuel quantity.

Preferably, ignition of the stratified charge is coordinated with the approximate time piston 213 reaches top dead centre of the compression stroke. The start of combustion depends on both the pilot fuel quantity and injection timing. For example, consider the case with a constant pilot fuel quantity but allowing changes in the pilot fuel injection timing. If the pilot fuel injection timing is advanced, the pilot fuel has more time to mix out into the intake charge. With a more dilute pilot fuel concentration, there is less impact on the auto-ignition properties of the fumigated charge (recall above discussion regarding homogeneous pilot fuel combustion). The start of combustion, therefore, becomes more retarded.

Next, consider the case where the pilot timing remains fixed and the pilot fuel quantity is increased. Here, the concentration of the pilot fuel in the pilot plume is increased leading to a larger impact on the auto-ignition characteristics of the fumigated charge. The start of combustion advances.

A limitation is also imposed on the allowable range of preferred pilot timings associated with the pre-mixed stratified pilot plume that ignites near top dead centre. Here, if the pilot timing is retarded too far, then an undesirable early start of combustion can result. This can lead to undesirable excessive knocking. In addition, due to the limited time to pre-mix, the pilot fuel combustion can be associated with a richer pilot plume zone than is preferred, leading to higher NOx and potentially higher particulate formation rates. Preferably, the pilot timing is not retarded before 50 degrees before TDC. Again, this range depends for the most part on injector design, the amount of pilot fuel injected, the amount of premixed gaseous fuel.

On the other end, it is preferable not to advance pilot timing beyond 120 degrees before TDC to maintain the desired stratification of the pilot plume.

Overall, when operating in the preferred pre-mixed stratified pilot fuel mode, the pilot timing range is limited to 120 to 50 degrees before TDC. When operating in the late, diffusion pilot fuel mode, the pilot timing is specified to be more retarded than 35 degrees before TDC.

The pilot fuel is preferably introduced into cylinder 210 between 120 and 50 crank angle degrees before TDC or between 30 and 10 crank angle degrees before TDC. This range that is generally found between approximately 30 and 50 crank angle degrees prior to TDC (for many engines) is referred to as the excessive knocking range. The optimal pilot fuel injection timing can vary with engine speed and load condition. Pilot fuel quantity and timing can also be adjusted if knocking is detected.

Note that the same excessive knocking range exists for the HCCI combustion mode alone. That is, when the gaseous fuel is substantially premixed with the intake charge prior to the start of combustion, and there is no directly injected fuel, the same constraints on pilot fuel timing exist.

It has been found as well that it is preferred to inject the pilot fuel either prior to 50 crank angle degrees prior to TDC or after 30 crank angle degrees before TDC. There is a range of crank angle degree within which pilot fuel injection should be avoided. This should be considered during engine transition periods when the controller is moving operation of the engine from a late cycle pilot fuel injection to an early cycle pilot fuel injection.

By way of example, during start-up of an engine or when the engine is running under where intake charge properties are not conducive to HCCI combustion (for example, possibly low load conditions or at low speed). Under these conditions it may be preferable to use a late pilot fuel injection to control ignition of the main fuel better. There can, however, be emissions penalties using a late pilot fuel injection (when the piston is near TDC) as compared to an earlier pilot fuel injection. The benefit of the late injection of pilot fuel is to remove uncertainty as to when ignition will occur. However, as noted above, it is desirable to use earlier cycle pilot fuel injection in other areas of the engine map. As such, when transitioning between late cycle pilot fuel injection and early cycle pilot fuel injection, controls should avoid the range between approximately 50 to 30 crank angle degrees prior to top dead center. Injectors should preferably allow for a transition from late pilot fuel injection (within 30 degrees of TDC) to an early pilot fuel injection (prior to 50 crank angle degrees prior to TDC) without transitioning through the region from 50 to 30 crank angle degrees before TDC. A preferred method is to use two pilot injections at the same time, and then turn the late pilot off once the stable combustion control is demonstrated under early pilot injection alone.

Figure 1C:
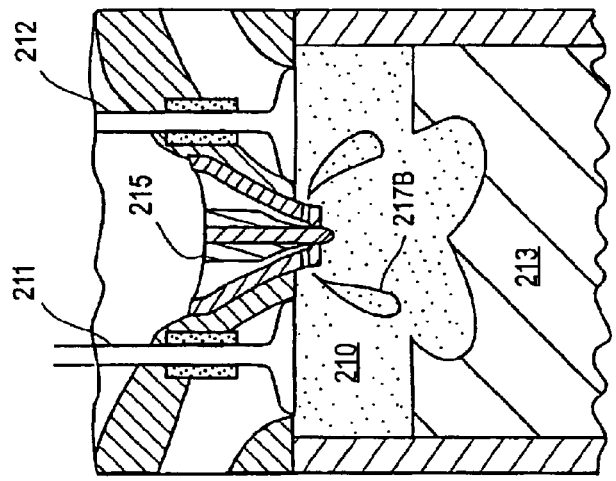

As shown in FIG. 1c, the second stage injection of main fuel 217b occurs when piston 213 is near top dead centre. Because main fuel 217b is introduced at the end of the compression stroke or early in the power stroke, it does not have an opportunity to thoroughly mix with the air in cylinder 210. Accordingly, second stage main fuel 217b burns substantially in a diffusion mode of combustion. Since most of the fuel in the pilot plume and a portion of the pre-mixed charge are burned by the time of the second stage main fuel introduction, injected main fuel 217b mixes with air and significant amounts of combustion products. The NOx formation rates are potentially reduced because of lower oxygen potential.

Since the quantity of first stage fuel 217a is limited by the engine's knock limit, engine power output is controlled under high load conditions by adjusting the quantity of second stage main fuel 217b.

Second stage fuel 217b can be injected in a plurality of injection pulses. When a pilot fuel is employed, a portion of second stage fuel 217b can be injected into cylinder 210 so that it combusts with pilot fuel 218 to assist with igniting the homogeneous charge. Second stage timing and quantity can be manipulated to influence intake manifold temperature and pressure to prevent knocking or contribute to conditions conducive to HCCI combustion.

Figure 2:
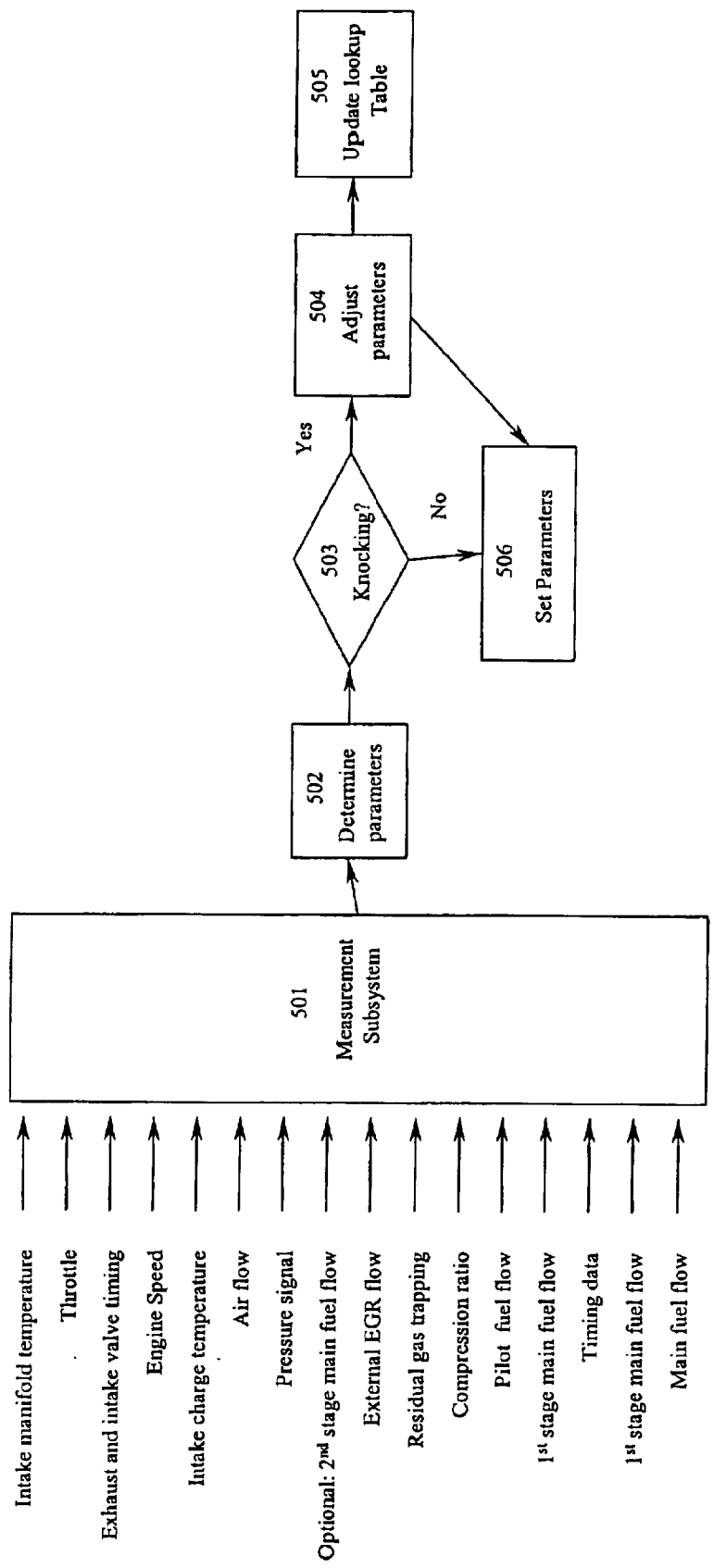
FIG. 2 is a control logic diagram that provides an example of the logic that might be employed by an electronic control unit to implement the disclosed method.

FIG. 2 illustrates a control logic diagram for an engine that employs a pilot fuel to initiate combustion of a gaseous main fuel. Measurement subsystem 501 can be used to collect data relating to current operating conditions. In a preferred embodiment, measurement subsystem 501 collects data relating to the throttle position, the engine speed, and other operating parameters, and sends this data to an electronic control unit (ECU). The ECU need not be a separate stand-alone component or unit, but can be integrated with other components such as, for example, engine operational data measuring devices. Measurement subsystem 501 can optionally provide additional data, such as intake manifold temperature; intake manifold pressure; intake air flow; external EGR flow rate; external EGR temperature; exhaust and intake valve timing; compression ratio; information that indicates the occurrence of knocking; information that indicates the start of combustion; information that indicates the heat release rate; and information that indicates the in-cylinder pressure.

The ECU preferably receives data from measurement subsystem 501 and registers or uses the data to calculate:
(a) the current engine speed;
(b) the current air flow (A);
(c) the current external EGR flow rate and temperature ($T_{EGR}$);
(d) the current intake manifold charge temperature (IMT);
(e) the current residual gas fraction trapping (which can be calculated from exhaust and intake valve timing);
(f) the current compression ratio (CR); and
(g) the current intake manifold pressure (IMP);
(h) the current start of combustion;
(i) the current heat release rate;
(j) the current in-cylinder pressure.

At step 502 the ECU determines the desired control parameters by referring, for example, to a look-up table that stores the required information. For example, for a given speed and load condition, the look-up table contains information regarding the calibrated intake manifold temperature, intake manifold pressure, compression ratio, residual gas fraction trapping, intake and exhaust valve timing, EGR flow rate, EGR temperature, the amount of main fuel to inject early, and the timing and amount of main fuel to inject in the second stage. Appropriate measures are taken to reach the calibrated values. For example, if the EGR flow rate is too low, then the EGR flow rate is increased.

In the present method, the values of intake manifold temperature, intake manifold pressure, compression ratio, residual gas trapping, intake and exhaust valve timing, EGR flow rate, EGR temperature, and the amount of pilot fuel injected and main fuel injected in the first and second stages are chosen such that engine operation is operating in light of calibrated values generally determined in light of maintaining high cycle efficiency while keeping NOx and PM levels as low possible while at the same time preventing the occurrence of knocking.

The ECU can also receive data from measurement subsystem 501 that indicates whether or not knocking occurs. If at step 503 the ECU detects knocking, then appropriate control measures are taken at step 504 to adjust parameters to prevent further knocking. For example, the amount of main fuel injected early is reduced or the pilot fuel quantity or timing are adjusted, with a corresponding increase in the amount of main fuel injected in the second stage near top dead centre. In addition, or in an alternative measure, based upon predetermined corrective actions set out in a look-up table, the ECU can, for example, elect to do one or more of the following:
(a) reduce the compression ratio;
(b) delay closing the intake valve;
(c) reduce IMT;
(d) reduce fumigated equivalence ratio, and
(e) reduce the external EGR rate To prevent further occurrences of knocking, at step 505 the ECU can recalibrate its stored values in its memory to recalibrate the value for knock limit.

At step 506 the ECU finally sets the engine operating parameters after taking into account the look up table values determined in step 502 and adjustments made in step 504. These parameters preferably include one of more of the following:
(a) first stage gaseous fuel flow;
(b) first stage gaseous fuel timing;
(c) intake manifold temperature;
(d) intake manifold pressure;
(e) intake valve timing;
(f) exhaust valve timing;
(g) external EGR flow rate and/or residual gas trapping;
(h) compression ratio;
(i) second stage gaseous fuel quantity;
(j) second stage gaseous fuel timing;
(k) pilot fuel timing; and
(l) pilot fuel quantity.

Figure 3:
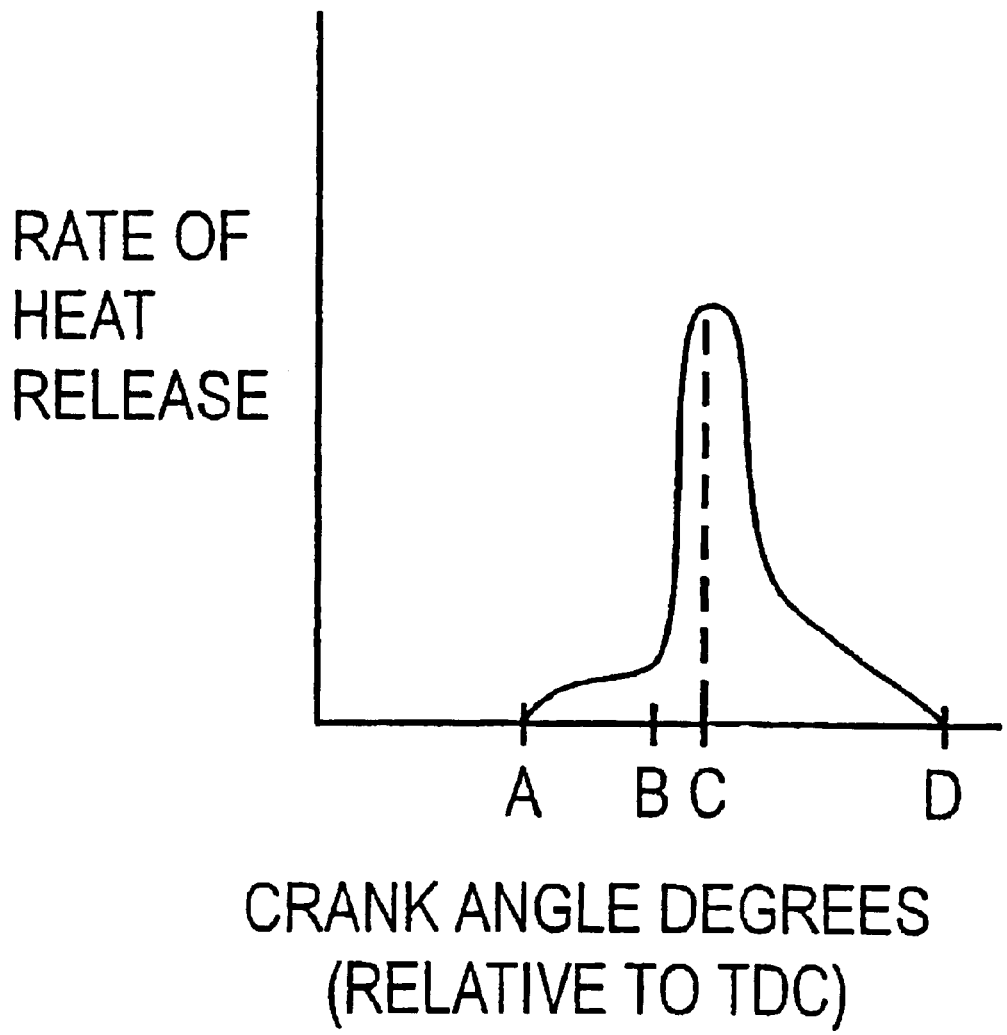
FIG. 3 depicts the rate of heat release associated with the HCCI mode and diffusion mode combustion processes.

An example of a rate of heat release curve corresponding to the method of FIG. 2 is depicted in FIG. 3. In this figure, the rate of heat release is plotted against crank angle degrees relative to TDC. The pilot plume combustion begins at crank angle degree X, which is near TDC (preferably within the range of between 20 degrees before or after TDC). The pre-mixed charge begins to burn rapidly shortly thereafter. Substantially all of the pre-mixed charge burning within the first 10–20 crank angle degrees after top dead centre, as shown by the relatively high rate of heat release which peaks after TDC at crank angle degree Y. It is expected that very little NOx is produced during the combustion of the lean pre-mixed charge. As discussed above, the timing of the on-set of pre-mixed charge combustion is controlled by at least one, and possibly several of the following parameters: intake manifold temperature, amount of main fuel injected early, intake manifold pressure, external EGR rate, residual gas trapping and timing and amount of main and pilot fuels injected in the three stages. The fuel/air ratio of the pre-mixed charge is knock and pressure limited (that is, if the fuel/air ratio is too rich, knocking can occur, or maximum in-cylinder pressure limits can be exceeded). The second stage of main fuel injection is timed to occur near top dead centre of the compression stroke. A portion of the main fuel introduced during the second stage also burns near TDC, contributing to the rate of heat release at crank angle degree Y. The fuel injected during this stage, however, burns substantially in a diffusion combustion mode contributing to the portion of the curve between crank angle degrees Y and Z. Preferably, the injection of the main fuel during the second stage is complete before 30 crank angle degrees after TDC of the compression stroke to maintain high cycle efficiency.

A further embodiment of the control strategy where pilot fuel is used to assist on initiate combustion includes a closed loop control that uses historical data indicative of pressure within the combustion chamber during a cycle of the engine. This data can be used to estimate combustion phasing or start of combustion (SOC) in previous cycles using this information to help control start of combustion in a current cycle of the engine. By way of example, sensors in communication with the combustion chamber to measure pressure or temperature, strain gauges, knock sensors or accelerometers can be used to provide a signal indicative of pressure or temperature that can then be used to estimate SOC.

An example of means of estimating SOC is to use a ratio between a pre-combustion signal and a post-combustion signal and correlate this an estimated SOC based on a predetermined calibrated relationship between the ratio and SOC. That is, crank angle A is chosen during the compression stroke prior to the commencement of combustion. This pressure-indicative signal, preferably, should be relatively high (as compared to a baseline pressure-indicative signal at such timing as bottom dead center where the pegging routine is expected to applied) to help maximize the signal to noise ratio inherent to the measured signal. Hence it is beneficial that A be recorded at a crank angle late in the compression stroke; however it is highly desirable that A is recorded at a crank angle prior to onset of combustion.

Crank angles, B is preferably chosen near the peak of the cylinder pressure-indicative signal. It is preferred that post-ignition sensor signal be selected near the peak in the cylinder pressure-indicative signal, and hence typically chosen during the combustion of the premixed fuel/air charge. It is expected, however that an estimate of SOC can be made, in any event, as long as the post-ignition sensor signal is provided during the power stroke.

Considering each step of the example method set out, the following provides a relationship used to determine SOC:

$$SOC_{est} = K_1 P_{ratio} + K_2 \qquad 1$$

where $$P_{ratio} = \left[\frac{P(B)}{P(A)}\right] \qquad 2$$

and P(A) and P(B) are the pressure-indicative measurements (or more specifically, the sensor measurements) at crank angle locations A and B Constants $K_1$ and $K_2$ are predetermined for the engine based on the linear relationship of $SOC_{est}$ vs. $P_{ratio}$.

Once SOC is estimated, combustion phasing can be controlled where the pilot fuel is used and allowed to stratify to some extent, by adjusting the quantity of the pilot fuel from cycle to cycle or over a short range of operation.

As used herein, the term "throttle" or "throttle position" has been used in a general sense to convey the load request on the engine. Typically, such a load request is set by the user and can be a foot pedal placement (in the case of a vehicular engine) or a predetermined load request (in the case of an energy generating engine). In general, there are many ways in which a user can set the load request and the term "throttle" (as used in this application) should be understood in this general sense.

While the disclosure describes preferred embodiments of the method and apparatus with reference to a four-stroke engine, those skilled in the art will understand that the same methods can be applied to two-stroke engines. Similarly, while the accompanying figures do not illustrate engines equipped with a glow plug or spark plug to assist with ignition of the fuel, engines equipped with such devices and their respective configurations are well known to those skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of introducing a pilot fuel into a cylinder of an operating internal combustion engine, said engine having a piston disposed within said cylinder, said method comprising:
    (a) monitoring a set of engine parameters;
    (b) determining engine load and engine speed from said set of engine parameters;
    (b) introducing a first quantity of a first gaseous fuel into said cylinder and an intake charge into said cylinder;
    (c) at a pilot fuel timing, introducing a pilot fuel quantity of said pilot fuel at said pilot fuel timing into said cylinder so that it ignites when said piston is at or near top dead centre of the compression stroke, said pilot timing avoiding a excessive knocking range during a compression stroke of said engine;
wherein said first quantity and said pilot fuel quantity and said pilot fuel timing are controllable in response to at least one of engine load and engine speed, said first quantity forming a premixed charge of fuel and air prior to ignition of said pilot fuel.

2. The method of claim 1 wherein said excessive knocking range is between 50 and 30 crank angle degrees before top dead center during said compression stroke.

3. The method of claim 1 further comprising directly injecting a second quantity of a second gaseous fuel into said combustion chamber when said piston is at or near top dead center wherein within the same engine cycle, said first gaseous fuel combusts according to a pre-mixed combustion mode and said second gaseous fuel combusts substantially according to a diffusion combustion mode.

4. The method of claim 3 wherein said pre-mixed combustion mode is a homogeneous charge compression ignition mode.

5. The method of claim 1 wherein said engine is a four-stroke engine.

6. The method of claim 1 wherein said first gaseous fuel is pre-mixed with said intake charge prior to being introduced into said cylinder.

7. The method of claim 1 wherein said set of engine parameters comprises at least one of engine speed, engine throttle position, intake manifold temperature, intake manifold pressure, exhaust gas recirculation flow rate and temperature, air flow into said cylinder, compression ratio, intake and exhaust valve timing, the presence or absence of knocking within said cylinder, and one of the start of combustion, heat release rate and pressure trance determined from a previous cycle of said engine.

8. The method of claim 2 wherein said pilot fuel timing is after said piston passes 120 crank angle degrees before top dead center of the compression stroke.

9. The method of claim 1 wherein said amount of said pilot fuel is dependent on a signal capable of being used to estimate start of combustion of said gaseous fuel during a previous cycle of said engine.

10. The method of claim 1 further comprising identifying an low load operating mode and a high load operating mode for said engine, wherein said pilot fuel timing is a late timing in said low load operating mode and said pilot fuel timing is an early timing in said high load operating mode.

11. The method of claim 10 wherein said early timing is prior to said excessive knocking range and said late timing after said excessive knocking range.

12. The method of claim 11 further comprising identifying a transition operating mode for said engine wherein said engine transitions between said low load operating mode and said high load operating mode.

13. The method of claim 12 wherein said transition operating mode transitions said pilot timing between said late timing and said early timing by jumping said excessive knocking range between successive cycles of said engine.

14. The method of claim 12 wherein said transition operating mode comprises, within a cycle of said engine, at least two pilot fuel injections, a first pilot fuel injection prior to said excessive knocking range and a second pilot fuel injection after said excessive knocking range.

15. The method of claim 1 further comprising changing at least one of said pilot fuel quantity and pilot fuel timing when knocking is detected.

16. The method of claim 1 wherein said pilot fuel is selected from the group consisting of diesel fuel and dimethylether.

17. The method of claim 1 wherein said pilot fuel is mixed with said first gaseous fuels and introduced into said cylinder together with said first gaseous fuel.

18. The method of claim 3 wherein said first and second gaseous fuels are the same gaseous fuel.

19. The method of claim 1 wherein said first gaseous fuel comprises at least one of natural gas, liquefied petroleum gas, bio-gas, landfill gas, and hydrogen gas.

20. An apparatus for introducing fuel into the cylinder of an operating internal combustion engine having at least one cylinder with a piston disposed therein, said fuel comprising a main fuel and a pilot fuel that is auto-ignitable to a degree greater than said main fuel, said apparatus comprising:
    (a) measuring devices for collecting operational data from said engine, said measuring devices comprising a tachometer for measuring engine speed and a sensor for determining throttle position;
    (b) an electronic control unit that receives said operational data and processes said data to compute a set of load conditions, said electronic control unit comprising memory for storing control sets of load conditions and predetermined operating modes for said control sets of load conditions, said electronic control unit matching said computed set of load conditions with said control sets of load conditions to select one of a plurality of predetermined operating modes;
    (c) a main fuel introduction system controlled by said electronic control unit to introduce said main fuel into said cylinder at times and in quantities determined by said electronic control unit in accordance with said predetermined operating modes and said set of load conditions; and
    (d) a pilot fuel injection valve controlled by said electronic control unit to introduce said pilot fuel into said cylinder at times and in quantities determined by said electronic control unit with said predetermined operating modes and said set of load conditions;
wherein said predetermined operating mode comprises a two stage introduction of fuel into said cylinder, whereby a first portion of said main fuel is introduced in a first stage to provide for a premixed fuel/air charge prior to combustion of said pilot fuel and said pilot fuel is introduced in a second stage, said controller and said pilot fuel injection valve capable of detecting and avoid an excessive knocking range for introduction of said pilot fuel.

21. The apparatus of claim 20 wherein said main fuel introduction system comprises an main fuel injection valve.

22. The apparatus of claim 21 wherein said main fuel injection valve and said pilot fuel injection valve are integrated into a dual fuel injection valve that is operable to inject each one of said main fuel and said pilot fuel independently from the other.

23. The apparatus of claim 20 wherein said main fuel introduction system comprises an auxiliary injection valve associated with an air induction system for introducing said main fuel into an air induction passage so that said main fuel is capable of mixing with intake air prior to being introduced to said cylinder.

24. The apparatus of claim 23 wherein said air induction passage is an air induction manifold.

* * * * *